United States Patent [19]

Ellwood et al.

[11] 4,141,776
[45] Feb. 27, 1979

[54] OPTICAL FIBRE SPLICE JIG

[75] Inventors: George Ellwood; David G. Dalgoutte, both of Harlow, England

[73] Assignee: International Standard Electric Corporation, New York, N.Y.

[21] Appl. No.: 850,295

[22] Filed: Nov. 10, 1977

[30] Foreign Application Priority Data

Nov. 10, 1976 [GB] United Kingdom ............... 46848/76

[51] Int. Cl.² ......................... B31F 5/00; B65N 69/02
[52] U.S. Cl. ..................................... 156/502; 156/158
[58] Field of Search ................... 156/158, 86, 502, 507

[56] References Cited

U.S. PATENT DOCUMENTS

| 3,276,929 | 10/1966 | Ferch | 156/158 |
| 3,810,802 | 5/1974 | Buhite et al. | 156/158 |
| 3,919,037 | 11/1975 | Miller | 156/158 |

Primary Examiner—Douglas J. Drummond
Attorney, Agent, or Firm—Thomas L. Peterson

[57] ABSTRACT

An apparatus for splicing a pair of optical fibres by a collapsed tube technique. The fibre ends are mounted on carrier slides with a coupling sleeve placed on one fibre end. A movable heater fuses the sleeve onto the one fibre after which the second fibre is inserted in the sleeve and held in axial alignment with the first fibre while the splice is completed.

2 Claims, 2 Drawing Figures

OPTICAL FIBRE SPLICE JIG

BACKGROUND OF THE INVENTION

This invention relates to methods of splicing optical fibres, and in particular to an apparatus for splicing a pair of such fibres by means of a coupling sleeve.

U.S. Pat. No. 4,078,910 to Dalgoutte discloses a process for coupling a pair of glass optical fibres by butting the bared ends together in a glass coupling sleeve and collapsing the sleeve around the butt joint to complete the splice. The present invention relates to a convenient apparatus for performing this process.

SUMMARY OF THE INVENTION

According to the invention there is provided a splicing jig arrangement for butt jointing a pair of optical fibres by the collapsed sleeve technique, including a base plate, a coupling sleeve carrier mounted on the base plate via a vertical slide mechanism, first and second fibre support and alignment means each mounted on the base plate via a respective horizontal slide mechanism, and a heater adapted to raise the temperature of the coupling sleeve above its softening point, in which said fibre support and alignment means are adapted to secure the fibres to be coupled in axial alignment with one another and in the same vertical plane as the axis of the coupling sleeve when mounted on the sleeve carrier, the vertical slide being operable to bring the coupling sleeve into axial alignment with the fibre so as to permit insertion of the fibres into the sleeve by operation of the respective horizontal slide mechanism.

DESCRIPTION OF THE PREFERRED EMBODIMENT

Figure 1:
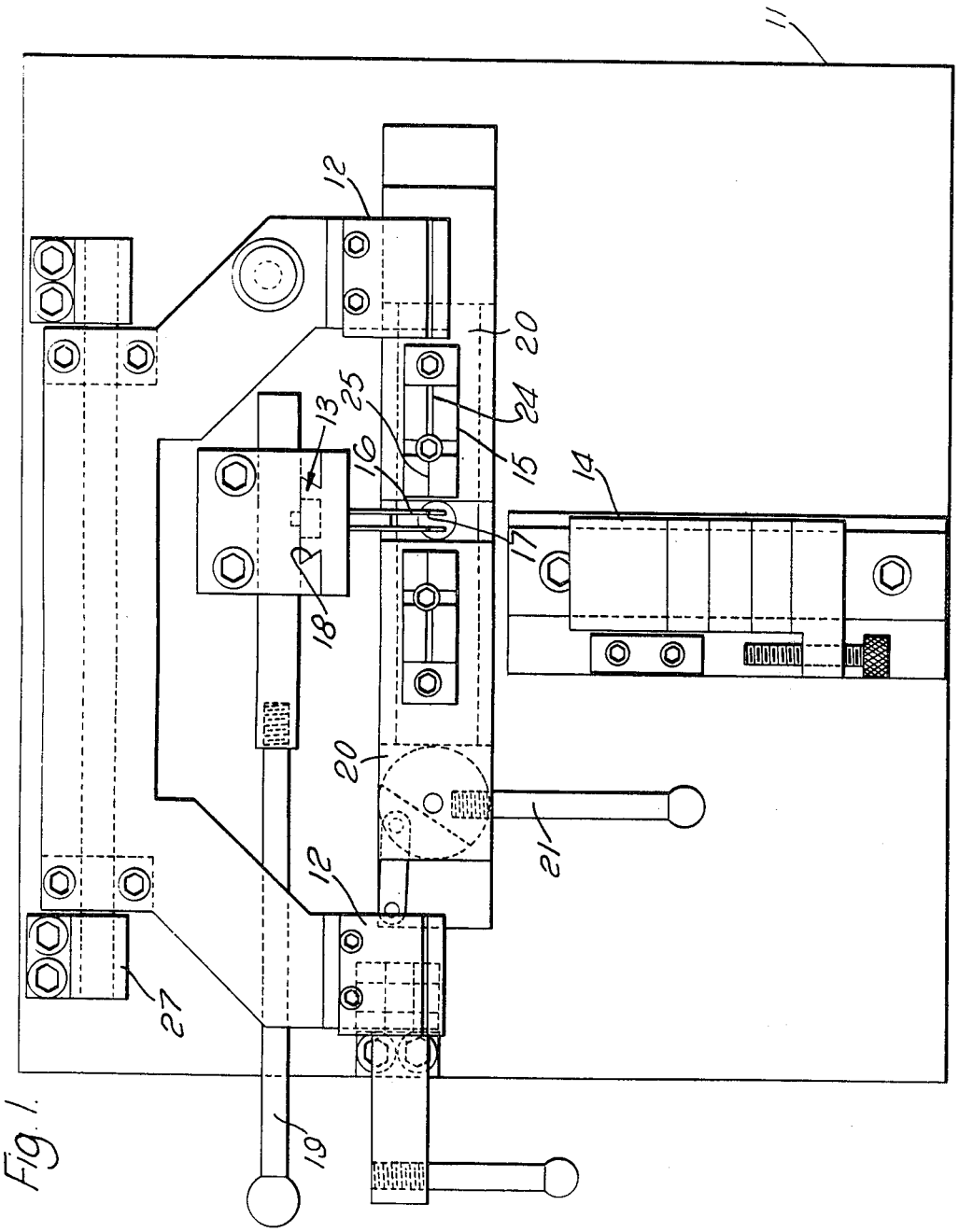
FIGS. 1 and 2 are schematic views of the fibre splicing apparatus according to the invention.
Figure 2:
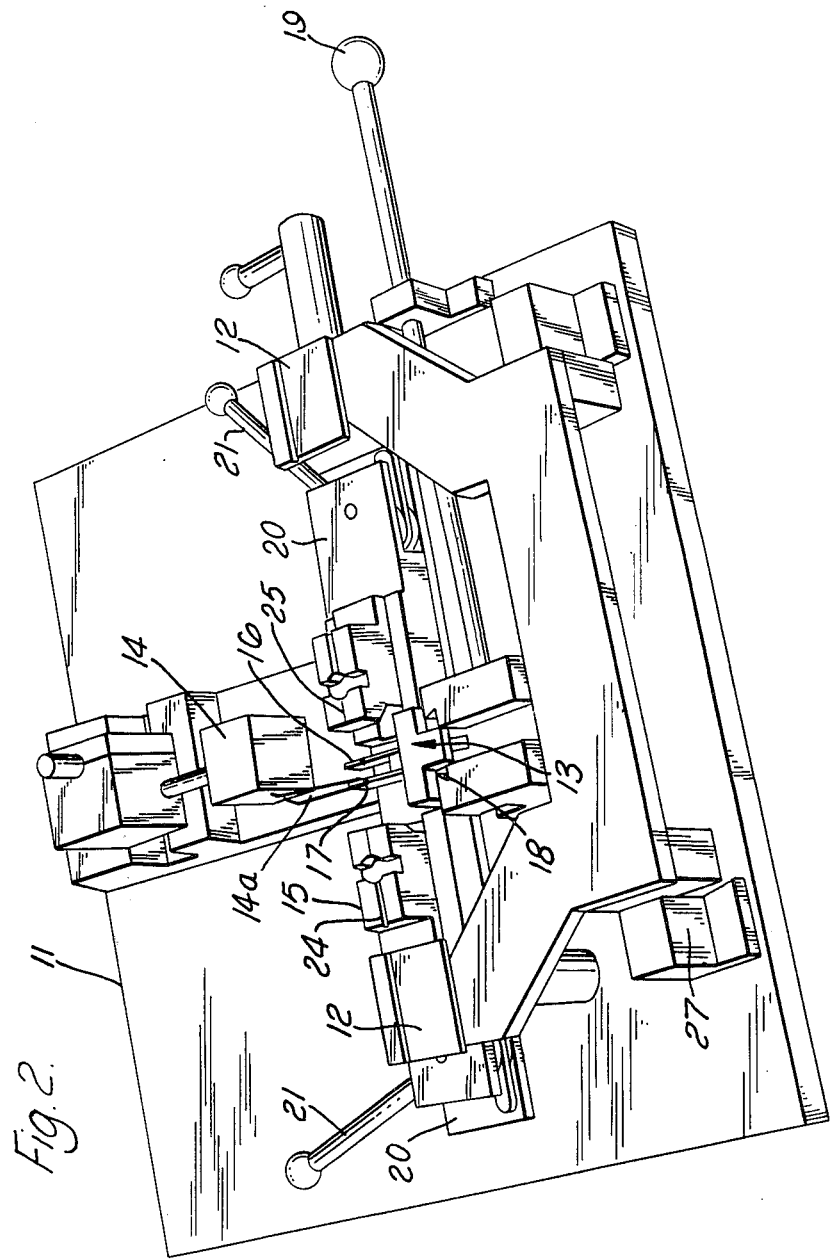

Referring to the drawings, the splicing apparatus is mounted on a base plate 11 and includes a pair of fibre support arms 12, a coupling sleeve support assembly 13, a movable heater head 14 and a pair of slidable fibre support and alignment guides 15. The coupling sleeve support assembly has a pair of parallel refractor, e.g. alumina, plate members 16 arranged vertically and each provided with a V-groove 17 cut in its upper edge and in which the coupling sleeve is located. The assembly is mounted on a vertical slide assembly 18 operable via a lever 19 and a cam mechanism (not shown).

The fibre support and alignment guides 15 are each mounted on a respective horizontal slide mechanism 20 operable via cam mechanisms (not shown) controlled by levers 21, and each has a relatively large V-groove 24 for receiving the coated fibre and a relatively small V-groove 25 for receiving the bared fibre end. These V-grooves are preferably machined simultaneously to ensure accurate alignment.

The various slides and support members are so arranged that when a coupling sleeve and a pair of fibres are correctly located the axis of the sleeve is in the same vertical plane as the axes of the two fibre ends.

A pair of coated fibres, e.g. of the plastics coated silica type, to be coupled are prepared by cutting the fibres perpendicular to their longitudinal axes and stripping back the coating to expose the fibre ends. The fibres are clamped in the V-grooves 24 and 25 of the fibre guides. A protective steel ferrule is slipped over the L.H. fibre end in FIG. 1. This ferrule is used to provide permanent mechanical protection for the completed joint.

A glass coupling sleeve is placed in the V-groove 17 of the plate members 16 and the vertical slide assembly 18 is adjusted such that the sleeve and the two fibre ends are all coaxial. One fibre end is inserted half-way into the sleeve via its respective horizontal slide mechanism and that half of the sleeve is collapsed on to the fibre by softening the sleeve with the heater wire 14a. The joint is allowed to cool, after which a drop of refractive index matching adhesive of the type which requires to be cured by ultra-violet light is injected into the open end of the sleeve and the second fibre end is inserted. The second fibre is manipulated backwards and forwards in the sleeve bore so as to expel air bubbles and is then pushed into abutment with the first fibre end. It is preferable to perform all these operations under a microscope so that correct performance is achieved. The adhesive is then cured to form the splice. The plastics coated fibres are next clamped to the support arms 12 and unclamped from the V-grooves 24 and 25 and the spliced joint is lifted from the jig by rotating the fibre support arms 12 around pivots 27. The steel ferrule is now slipped over the splice and bonded to the plastics coating to provide a permanent joint.

We claim:

1. A splicing jig arrangement for butt jointing a pair of optical fibres by the collapsed sleeve technique comprising: a base plate, a coupling sleeve carrier mounted on said base plate via a vertical slide means, first and second fibre support and alignment means each mounted on said base plate via a respective horizontal slide means, and a movable heater means, mounted on said base plate adapted to raise the temperature of the coupling sleeve above its softening point, said fibre support and alignment means being adapted to secure the fibres to be coupled in axial alignment with one another and in the same vertical plane as the axis of the coupling sleeve when mounted on said sleeve carrier, and said vertical slide means being operable to bring the coupling sleeve into axial alignment with the fibre so as to permit insertion of the fibres into the sleeve by operation of the respective horizontal slide means.

2. An arrangement according to claim 1 including: a pair of additional fibre support means adapted to secure the fibres between which said first and second support means are aligned, and means for moving said additional pair of support means laterally relative to said first and second support means to remove the coupling sleeve, when the fibres are butt jointed within the sleeve, from said sleeve carrier to permit further operations to be carried out on the splice before removal of the completed splice from the jig arrangement.

* * * * *